United States Patent
Waite et al.

(10) Patent No.: US 10,641,099 B1
(45) Date of Patent: May 5, 2020

(54) IMPINGEMENT COOLING FOR A GAS TURBINE ENGINE COMPONENT

(71) Applicant: United Technologies Corporation, Hartford, CT (US)

(72) Inventors: Ryan Alan Waite, South Windsor, CT (US); Matthew A. Devore, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 1302 days.

(21) Appl. No.: 14/617,228

(22) Filed: Feb. 9, 2015

(51) Int. Cl.
    *F01D 5/18* (2006.01)
    *F01D 25/12* (2006.01)

(52) U.S. Cl.
    CPC ............ *F01D 5/186* (2013.01); *F01D 5/187* (2013.01); *F01D 5/189* (2013.01); *F01D 25/12* (2013.01); *F05D 2260/201* (2013.01); *F05D 2260/2212* (2013.01); *F05D 2260/22141* (2013.01)

(58) Field of Classification Search
    CPC .......... F01D 5/186; F01D 5/187; F01D 5/189; F01D 25/12; F05D 2260/201; F05D 2260/22141; F05D 2260/2212
    See application file for complete search history.

(56) References Cited

U.S. PATENT DOCUMENTS

| | | | |
|---|---|---|---|
| 5,353,865 A * | 10/1994 | Adiutori | F28F 13/02 165/109.1 |
| 6,354,795 B1 | 3/2002 | White et al. | |
| 6,439,846 B1 | 8/2002 | Anderson et al. | |
| 8,231,349 B2 * | 7/2012 | Naik | F01D 5/186 416/97 R |
| 8,714,909 B2 | 5/2014 | Propheter-Hinckley | |
| 9,133,717 B2 * | 9/2015 | Nakamata | F01D 5/186 |
| 2010/0310367 A1 | 12/2010 | Devore et al. | |
| 2012/0020786 A1 | 1/2012 | Ayres | |
| 2013/0177396 A1 | 7/2013 | Winn | |
| 2014/0290257 A1 * | 10/2014 | Okita | F01D 5/189 60/752 |
| 2016/0116166 A1 | 4/2016 | Drake et al. | |

FOREIGN PATENT DOCUMENTS

| | | |
|---|---|---|
| EP | 1043479 | 10/2000 |
| EP | 2107215 | 10/2009 |
| EP | 2233693 | 9/2010 |
| EP | 2792850 | 10/2014 |
| GB | 2246174 | 1/1992 |

OTHER PUBLICATIONS

Extended European Search Report for Application No. 16154904.3 dated Jun. 1, 2016.

\* cited by examiner

*Primary Examiner* — Dwayne J White
*Assistant Examiner* — Behnoush Haghighian
(74) *Attorney, Agent, or Firm* — Carlson, Gaskey & Olds, P.C.

(57) ABSTRACT

An impingement cooled component includes a first wall having a plurality of impingement holes and a second wall spaced apart from the first wall. The second wall is downstream of the first wall, relative to a cooling flow, the second wall has a contoured surface facing the first wall. The contoured surface includes a plurality of contours defined by at least one of a plurality of peaks and a plurality of valleys, and at least one of the contours in the plurality of contours is aligned with an axis defined by one of the impingement holes in the plurality of impingement holes.

16 Claims, 4 Drawing Sheets

IMPINGEMENT COOLING FOR A GAS TURBINE ENGINE COMPONENT

STATEMENT REGARDING FEDERALLY SPONSORED RESEARCH OR DEVELOPMENT

This invention was made with government support under Contract No. FA 8650-09-2923-0021, awarded by the United States Air Force. The Government has certain rights in this invention.

TECHNICAL FIELD

The present disclosure relates generally aircraft component cooling, and more specifically to an impingement cooling system for an aircraft component.

BACKGROUND

Gas turbine engines function by drawing air into the gas turbine engine and compressing the air using a compressor. The compressed air is passed along a primary flow path to a combustor. In the combustor, the compressed air is mixed with fuel and ignited. The resultant combustion gasses are expelled along the primary flow path through a turbine section. The combustion gasses expand across the turbine section and drive the turbine section to rotate. The turbine section is connected to the compressor via a shaft, and the rotation of the turbine section drives the compressor to rotate.

Portions of a turbine engine operate at extreme temperatures and components in these portions require cooling. One method employed to cool, or partially cool, some components within a gas turbine engine is impingement cooling.

SUMMARY OF THE INVENTION

In one exemplary embodiment, an impingement cooled component includes a first wall including a plurality of impingement holes and a second wall spaced apart from the first wall. The second wall is downstream of the first wall, relative to a cooling flow, the second wall having a contoured surface facing the first wall. The contoured surface includes a plurality of contours defined by at least one of a plurality of peaks and a plurality of valleys, and at least one of the contours in the plurality of contours is aligned with an axis defined by one of the impingement holes in the plurality of impingement holes.

In another exemplary embodiment of the above described impingement cooled component, each of the impingement holes defines an impingement axis, and wherein the impingement axis is approximately normal to the second wall.

In another exemplary embodiment of any of the above described impingement cooled components, each of the impingement holes defines an impingement axis, and wherein the impingement axis is angled relative to the second wall.

In another exemplary embodiment of any of the above described impingement cooled components, the second wall further comprises a plurality of film holes, each of the film holes providing a fluid passageway connecting the contoured surface of the second wall with a second surface of the second wall.

In another exemplary embodiment of any of the above described impingement cooled components, at least one of the film cooling holes connects a peak of at least one contour of the contoured surface with the second surface of the second wall.

In another exemplary embodiment of any of the above described impingement cooled components, at least one of the film cooling holes connects a valley of at least one contour of the contoured surface with the second surface of the second wall.

In another exemplary embodiment of any of the above described impingement cooled components, the contoured surface comprises a plurality of substantially identical contours.

In another exemplary embodiment of any of the above described impingement cooled components, the plurality of contours are approximately evenly distributed across the contoured surface.

In another exemplary embodiment of any of the above described impingement cooled components, the plurality of contours are a first density in a first region of the contoured surface and a second density, different from the first density, in a second region of the contoured surface.

In another exemplary embodiment of any of the above described impingement cooled components, the second wall further includes a second surface opposite the contoured surface and wherein the second surface is approximately straight.

In another exemplary embodiment of any of the above described impingement cooled components, the second wall is a wall of one of a turbine rotor, a turbine vane, a blade outer air seal, a rotor platform, a vane platform, and a blade outer air seal platform.

An exemplary method for cooling a component includes directing at least one impingement jet onto a contoured surface of a cooled component, thereby increasing a surface area of the cooled component contacted by the impingement jet, relative to a non-contoured surface.

In a further example of the above described exemplary method, at least a portion of the contours of the contoured surface are cooling contours.

A further example of any of the above described exemplary methods further includes generating a cooling film on a second surface of the cooling component using film cooling holes connecting the contoured surface to the second surface, wherein the second surface is opposite the contoured surface.

A further example of any of the above described exemplary methods further includes directing at least a portion of a cooling flow from the at least one impingement jet to a valley defined between at least two peaks of the contoured surface, using angled sides of the contours.

A further example of any of the above described exemplary methods includes directing at least one impingement jet onto a contoured surface by directing a plurality of impingement jets onto the contoured surface, and wherein the plurality of impingement jets are evenly distributed across the contoured surface.

A further example of any of the above described exemplary methods includes directing at least one impingement jet onto a contoured surface by directing a plurality of impingement jets onto the contoured surface, and wherein the plurality of impingement jets are unevenly distributed across the contoured surface.

In one exemplary embodiment a gas turbine engine component includes a component wall having at least a first surface and a second surface, an impingement baffled spaced apart from the component wall and including a plurality of impingement holes, and the first surface of the component wall facing the impingement baffle and including a plurality of cooling contours, wherein each of the cooling contours is aligned with a corresponding impingement hole.

Another exemplary embodiment of the above described gas turbine engine further includes a plurality of film cooling holes connecting the first surface and the second surface, and configured to establish a film cooling layer across at least a portion of the second surface.

In another exemplary embodiment of any of the above described gas turbine engines, each of the cooling contours includes at least one angled surface configured to direct a cooling flow from an impingement jet to a valley defined between at least two cooling contours.

These and other features of the present invention can be best understood from the following specification and drawings, the following of which is a brief description.

DETAILED DESCRIPTION OF AN EMBODIMENT

Figure 1:
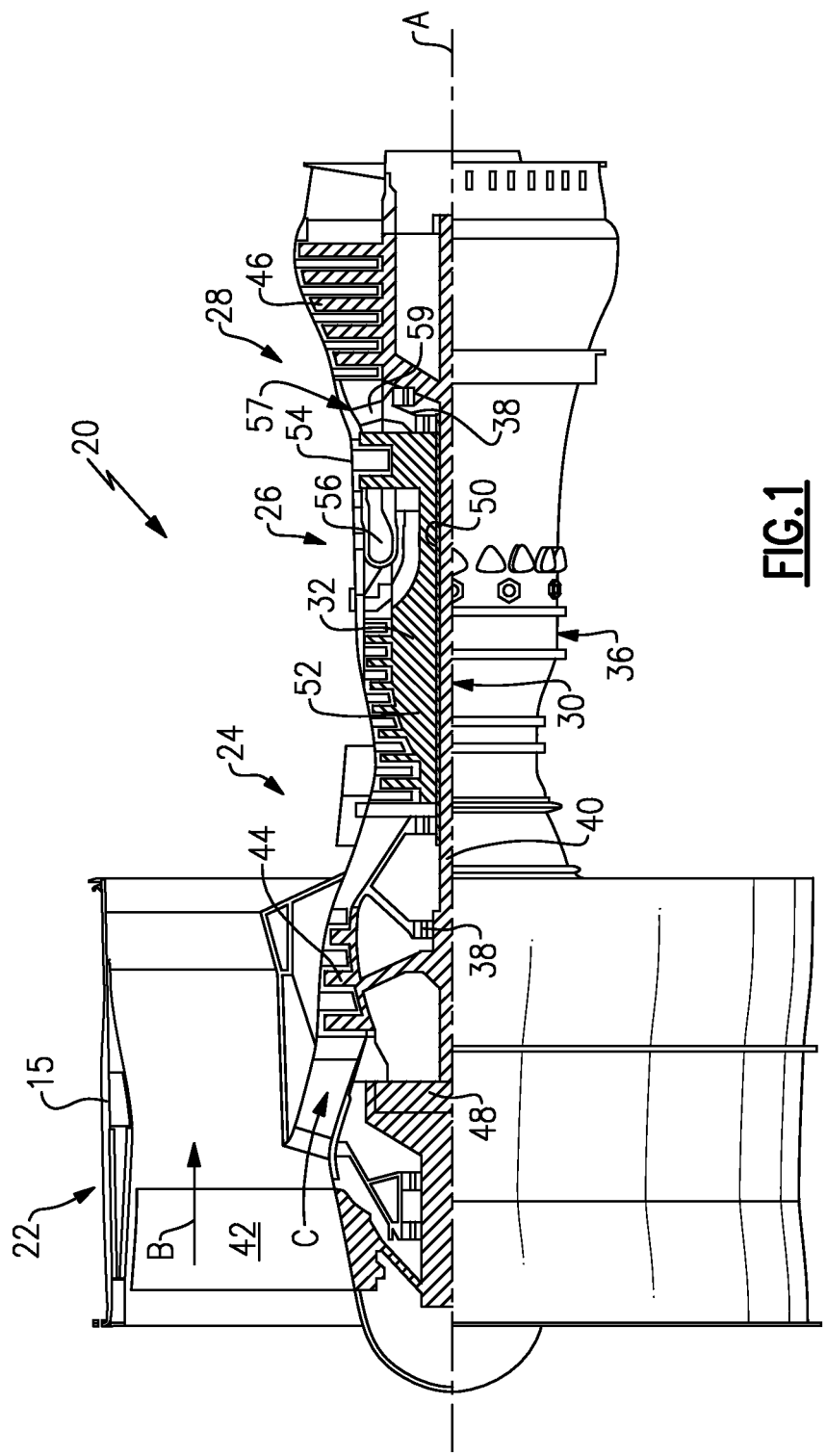
FIG. 1 schematically illustrates a gas turbine engine, according to one example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second.

During operation of the above described gas turbine engine 20, multiple components, such as turbine rotors, turbine vanes, blade outer air seals, rotor platforms, vane platforms, and the like are exposed to high operating temperatures that require the component to be cooled. One method utilized to cool components exposed to the extreme temperatures is impingement cooling. Impingement cooling projects multiple impingement jets onto a surface of the component being cooled, thereby cooling the component.

In existing impingement cooling systems an impingement plate, or baffle, is positioned upstream of the surface being cooled, relative to a coolant flow. The impingement plate includes multiple through holes. The through holes are referred to as impingement holes. A cooling fluid, such as air, is directed onto the impingement plate along the coolant flow. The impingement holes allow the passage of the cooling fluid through the impingement plate, and direct jets of the cooling fluid onto the surface being cooled. The jets are referred to as impingement jets. Due to the restricted area through which the cooling fluid can flow, the impingement jets are accelerated relative to the cooling flow directed at the impingement plate. In alternate impingement cooling embodiments, alternate cooling fluids can be used, and the impingement jets are not restricted to air based or gas based coolants.

The accelerated impingement jets contact the cooled surface, and provide a cooling effect. The greater the surface area of the cooled component contacted by the impingement jets, the greater the magnitude of the cooling provided by the impingement jets.

Existing cooling systems do not alter the outwardly facing surface of the cooled wall and the impingement jets are limited to impacting the existing wall features. As a result, the impingement jets contact a narrow surface of the cooled wall approximately equal to the area of the impingement hole, and do not provide a maximum possible cooling effect.

Figure 2:
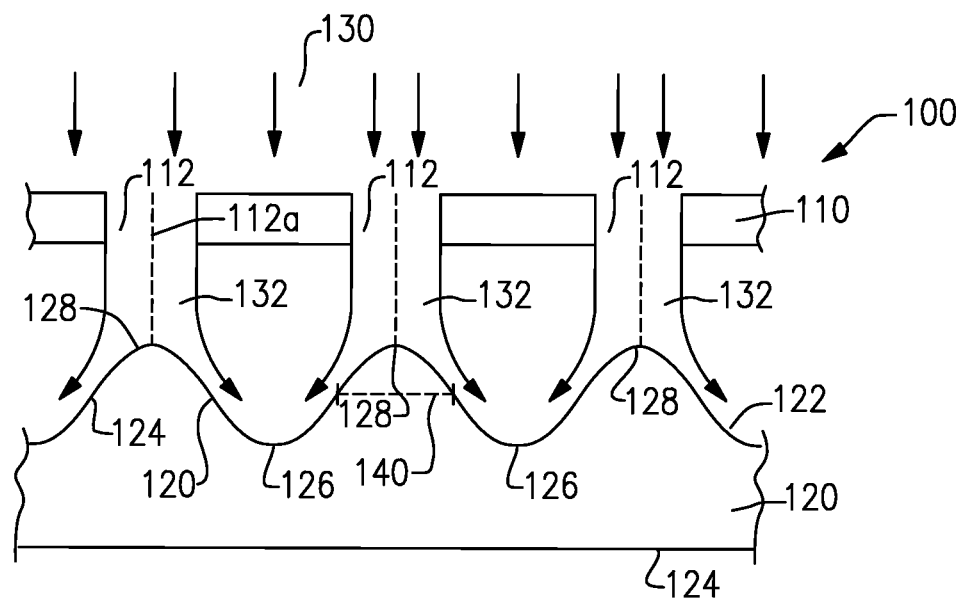
FIG. 2 schematically illustrates a first example impingement cooling structure for a gas turbine engine component.

With continued reference to FIG. 1, FIG. 2 Schematically illustrates a cross sectional view of an impingement cooling structure 100 for a cooled component of a gas turbine engine according to one example. The illustrated impingement cooling structure 100 includes an impingement plate 110 is disposed between a cooled wall 120 of the component being cooled and a cooling flow 130. The impingement plate 110 includes multiple impingement holes 112 distributed across the impingement plate 110.

Each impingement hole 112 provides a fluid passageway that allows a portion of the cooling fluid in the cooling flow 130 through the impingement plate 110. Due to the restricted flow through the impingement holes 112, the cooling flow 130 is projected through the impingement plate 110 toward the cooled wall 120 as impingement jets 132.

The cooled wall 120 has a contoured surface 122 and a straight surface 124, with the contoured surface 122 facing the impingement plate 110. In alternative embodiments, the straight surface 124 can be replaced with a surface having contours, ridges, or any features required for the operation of the component including the cooled wall 120. The contoured surface 122 includes multiple contours defined by peaks 128 and valleys 126 between the peaks 128. Each peak 128 is a portion of a contour closest to the impingement plate 110. Each valley 126 is a transition region between two or more peaks 128. Each of the peaks 128 is aligned with an axis 112a defined by one of the impingement holes 112. The contours on the contoured surface 122 are cooling features incorporated on the contoured surface 122 to aid in cooling and are not necessary for the primary functions of the cooled component. Contours incorporated solely as cooling features are referred to as "cooling contours". The alignment of the peaks 128 of each contour with the axis 112a of a corresponding impingement hole 112 ensures that each impingement jet 132 is centered on one of the contours. The centering of the impingement jet 132 on a contour is referred to as the impingement jet 132 being aligned with the contour.

By aligning the impingement jets 132 with a contour, each impingement jet contacts the entire surface of the contour, including angled side surfaces 129. In contrast, impingement jets contacting a non-contoured surface, such as in existing systems, impact on significantly less surface area, illustrated by dashed line 140. Increasing the surface area of the cooled wall 120 that is impacted by the impingement jet 132 increase the amount of direct cooling achieved by the impingement jet 132. Additionally, the curvature, or angling, of the angled surfaces 129 directs the cooling flow from the impingement jets 132 toward the valleys 126 between the contour peaks 128. In this way, the cooling effect of each impingement jet 132 is increased, and provided to the remainder of the contoured surface 122 of the cooled wall 120.

In the illustrated example, each of the peaks 128 is aligned with a corresponding impingement hole 112. One of skill in the art, having the benefit of this disclosure, will understand, however, that the number of impingement holes 112 can be less than the number of contours. In such an example, each impingement hole 112 is aligned with one of the contours, however, not every contour is aligned with an impingement hole 112.

In some examples, the cooling effect provided by the impingement cooling is insufficient to cool the component, or additional cooling is needed on the straight surface 124 of the cooled wall 120. In such examples, additional cooling methods, such as a film cooling method, are utilized in conjunction with the impingement cooling.

Figure 3:
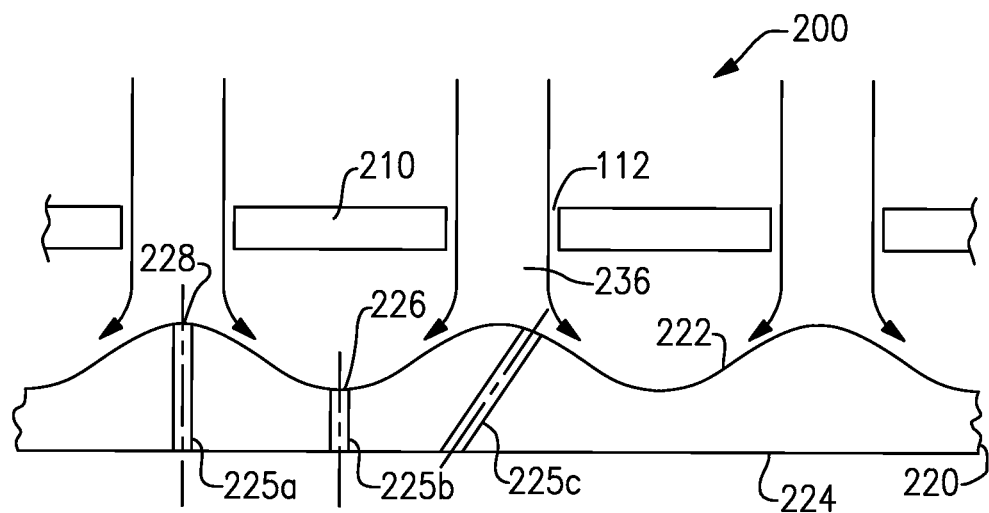
FIG. 3 schematically illustrates a second example impingement cooling structure for a gas turbine engine component.

With continued reference to FIGS. 1-2 and with like numerals indicating like elements, FIG. 3 schematically illustrates a second example impingement cooling structure 200 for a gas turbine engine component including film cooling features. Film cooling is a cooling method that produces a thin layer of coolant along a surface. The layer of coolant is referred to as a film, and provides a buffer between the surface and the hot environment, as well as providing a cooling effect along the surface.

In the illustrated example of FIG. 3, impingement cooling, including an impingement plate 210, operates from the interior of the component, and the straight surface 224 (referred to as the interior surface 224) is an exterior surface of the component. During operation, the impingement plate 210 generates impingement jets 236, which impinge upon, and cool, a contoured surface 222 of the component as in the example of FIG. 2. The cooled wall 220 further includes multiple film cooling holes 225a, 225b, 225c. Each of the film cooling holes 225a, 225b, 225c provides a through hole connecting the contoured surface 222 to the straight surface 224. Coolant from the impingement jets 236 passes through the film cooling holes and is output as a film layer along the straight surface 224.

Each of the exemplary film cooling holes 225a, 225b, 225c is positioned or oriented in a different manner for explanatory purposes. Each film cooling hole arrangement or orientation is suitable for a different purpose, and a given cooled engine component can include multiple different film cooling hole orientations or arrangements depending on the particular cooling needs. In alternative examples, each of the film cooling holes 225a, 225b, 225c are a uniform arrangement and orientation.

With regards to the exemplary film cooling holes, 225a, 225b, 225c, the first film cooling hole 225a connects a peak 228 of the contoured surface 222 to the straight surface 224 along the axis defined by the impingement jet 236. The second exemplary film cooling hole 225b connects a valley 226 to the straight surface 224, in the shortest distance possible. The third exemplary film cooling hole 225c connects a peak 228 to the straight surface 224 along an angled passageway.

An inlet opening for the first film cooling hole 225a is positioned directly in the center of the corresponding impingement jet 236. Due to the central positioning, the first exemplary film cooling hole 225a provides the largest volume of coolant through the film cooling hole 225a to generate the cooling film. In contrast, the inlet for the second film cooling hole 225b is positioned in the valley 226 of the contoured surface 222, and receives coolant that has been directed into the valley 226 by the angled surfaces 229 of the contours. The second film cooling hole 225b provides optimal impingement coolant flow along the contoured surface 222, at the cost of added heat pickup by the coolant flow, added pressure loss of the coolant flow, or both. The third example film coolant hole 225c is angled relative to the impingement jet 236 and to the straight surface 224. The angled film cooling hole 225c projects the film layer along the straight surface 224 allowing the coolant film to be more effective than in the other example film coolant holes 225a, 225b.

One of skill in the art, having the benefit of this disclosure, will be able to determine a suitable configuration of film cooling holes in conjunction with the impingement cooling for any given application. Further, one of skill in the art will understand that the above arrangements and orientations of film cooling holes 225a, 225b, 225c can be intermixed or used uniformly in any given cooled component.

Figure 4:
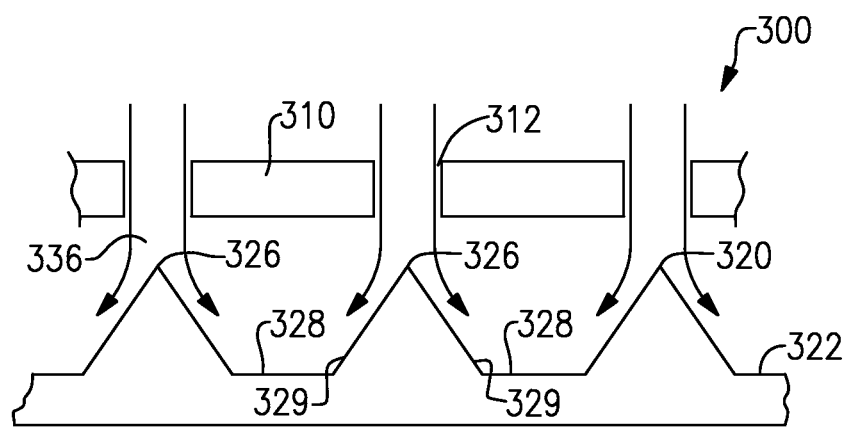
FIG. 4 schematically illustrates a third example impingement cooling structure for a gas turbine engine component.

With continued reference to FIGS. 1-3, and with like numerals indicating like elements, FIG. 4 schematically illustrates an impingement cooling structure 300 according to a third example. The impingement cooling structure 300 of FIG. 4 functions in substantially the same manner as the impingement cooling structure 100 of FIG. 2. The structure 300 of FIG. 4, however, differs from the structure of FIG. 2 in the shape of the contoured elements. As with the previous example, the contoured surface includes peaks 326 and valleys 328 defined between the peaks 326. Impingement jets 336 are generated by impingement holes 312 in an impingement plate 310. In the example of FIG. 4, however, each of the peaks 326 is defined as the apex of a pyramid structure, with each pyramid structure having one or more angled sides 329. The base of each pyramid structure can be any suitable geometric shape including circles, triangles, rectangles, or the like. Further, as with the example of FIG. 2, the angled sides 329 direct coolant from the impingement jet 336 into the valley 328.

In yet further alternative examples, other contour shapes beyond the rounded curve and the pyramid shapes illustrated in FIGS. 2 and 4 can be utilized to at least partially achieve the above described benefits. Further, the types of contouring can be interchanged or intermixed depending on the cooling needs of a particular application.

With reference now to FIGS. 2-4 collectively, each of the impingement holes 112, 212, 312 is oriented approximately normal to the cooled wall 220. This orientation provides for a maximum increased cooling surface area from the contours on the contoured surface. In some examples, however, increasing the cooling flow through the gap defined between the impingement plate 110, 210, 310 and the cooled component is more important than maximizing the cooling of each impingement jet. In such an example, alternate orientations of the impingement holes 112, 212, 312 can be utilized.

Figure 5:
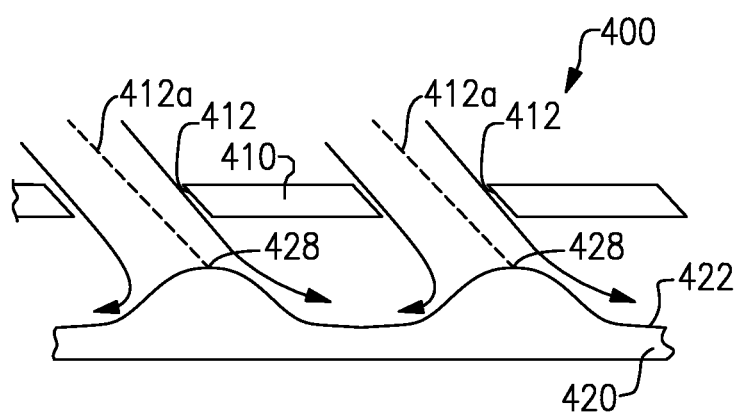
FIG. 5 schematically illustrates a fourth example impingement cooling structure for a gas turbine engine component.

With continued reference to FIGS. 1-4, and with like numerals indicating like elements, FIG. 5 illustrates a similar impingement cooled structure 400 to the impingement cooled structure 100 of Figured 1. The impingement cooled structure 400 of FIG. 5 varies from the impingement cooled structure of FIG. 4 in that each of the impingement holes 412 in the impingement plate 410 is angled relative to the cooled wall 420. An axis 412a of each impingement jet 412 is directed by the angle of the impingement holes 412 toward a peak 428 of each contour on the contoured surface 422 of the cooled wall 420. Angled impingement holes 412, such as the impingement holes 412 of FIG. 5 direct the coolant flow through a gap defined between the impingement plate 410 and the cooled wall 420, and provide a more controlled coolant flow through the gap.

Figure 6A:
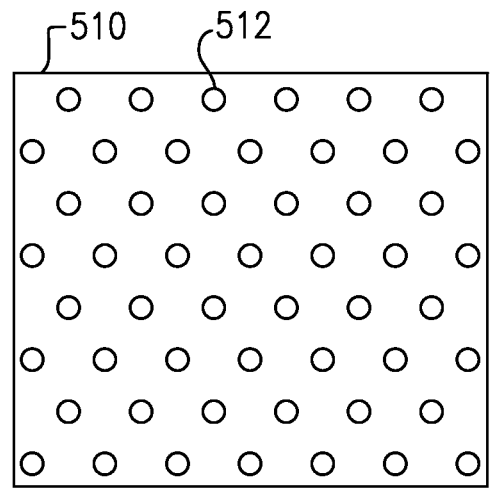
FIG. 6a illustrates a first example impingement hole configuration on an impingement plate.
Figure 6B:
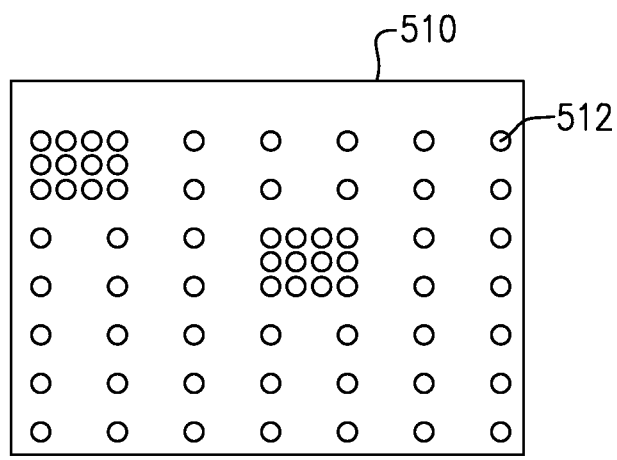
FIG. 6b illustrates a second example impingement hole configuration on an impingement plate.

With continued reference to FIGS. 1-5, FIGS. 6a and 6b illustrate exemplary impingement plates 510. Each of the plates 510 includes multiple impingement holes 512 distributed across the surface of the plate 510. In the example of FIG. 6a, each of the impingement holes 512 is distributed evenly across the impingement plat 510, and the contoured surface of the cooled component is evenly cooled by the impingement cooling. In alternative examples, certain areas of the cooled component can be hotter, or require increased cooling due to material composition, or for any other reason. In such an instance, the distribution of impingement holes is denser in the region requiring increased cooling. In addition, the contouring of the cooled surface is also denser in the region requiring increased cooling.

One of skill in the art, having the benefit of the above disclosure will understand that the concepts and structures illustrated in FIGS. 2-5 can be utilized alone or in conjunction with each other, and can be intermixed into a single impingement cooling structure depending on the cooling needs of a given system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. An impingement cooled component comprising:
a first wall including a plurality of impingement holes;
a second wall spaced apart from said first wall, wherein the second wall is downstream of said first wall, relative to a cooling flow, the second wall having a contoured surface facing said first wall;
wherein said contoured surface includes a plurality of contours defined by at least one of a plurality of peaks and a plurality of valleys; and
wherein a peak of each contour in said plurality of contours is aligned with an axis defined by one of said impingement holes in said plurality of impingement holes.

2. The impingement cooled component of claim 1, wherein each of said impingement holes defines an impingement axis, and wherein said impingement axis is normal to said second wall.

3. The impingement cooled component of claim 1, wherein each of said impingement holes defines an impingement axis, and wherein said impingement axis is angled relative to said second wall.

4. The impingement cooled component of claim 1, wherein the second wall further comprises a plurality of film holes, each of said film holes providing a fluid passageway connecting said contoured surface of said second wall with a second surface of said second wall.

5. The impingement cooled component of claim 4, wherein at least one of said film cooling holes connects a peak of at least one contour of said contoured surface with said second surface of said second wall.

6. The impingement cooled component of claim 4, wherein at least one of said film cooling holes connects a valley of at least one contour of said contoured surface with said second surface of said second wall.

7. The impingement cooled component of claim 1, said contoured surface comprises a plurality of identical contours.

8. The impingement cooled component of claim 1, wherein said plurality of contours are evenly distributed across said contoured surface.

9. The impingement cooled component of claim 1, wherein said plurality of impingement holes are a first density in a first region of said first wall and a second density, different from said first density, in a second region of said first wall.

10. The impingement cooled component of claim 1, wherein said second wall further comprises a second surface opposite said contoured surface and wherein said second surface is straight.

11. The impingement cooled component of claim 1, wherein the second wall is a wall of one of a turbine rotor, a turbine vane, a blade outer air seal, a rotor platform, a vane platform, and a blade outer air seal platform.

12. A method for cooling a component comprising: directing a plurality of impingement lets onto a plurality of peaks of a contoured surface of a cooled component, thereby increasing a surface area of the cooled component contacted by the impingement jet, relative to a non-contoured surface, and generating a cooling film on a second surface of the cooling component using film cooling holes connecting the contoured surface to the second surface, wherein the second surface is opposite the contoured surface.

13. A method for cooling a component comprising: directing a plurality of impingement lets onto a plurality of peaks of a contoured surface of a cooled component, thereby increasing a surface area of the cooled component contacted by the impingement jet, relative to a non-contoured surface, wherein directing at least one impingement jet onto a contoured surface comprises directing a plurality of impingement jets onto the contoured surface, and wherein the plurality of impingement jets are unevenly distributed across the contoured surface.

14. A gas turbine engine component comprising:
a component wall having at least a first surface and a second surface;
an impingement baffle spaced apart from said component wall and including a plurality of impingement holes; and
the first surface of the component wall facing said impingement baffle and including a plurality of cooling contours, wherein a peak of each of said cooling contours is aligned with an axis of a corresponding impingement hole.

15. The gas turbine engine component of claim 14, further comprising a plurality of film cooling holes connecting said first surface and said second surface, and configured to establish a film cooling layer across at least a portion of said second surface.

16. The gas turbine engine component of claim 14, wherein each of said cooling contours includes at least one angled surface configured to direct a cooling flow from an impingement jet to a valley defined between at least two cooling contours.

* * * * *

UNITED STATES PATENT AND TRADEMARK OFFICE
CERTIFICATE OF CORRECTION

PATENT NO. : 10,641,099 B1
APPLICATION NO. : 14/617228
DATED : May 5, 2020
INVENTOR(S) : Ryan Alan Waite and Matthew A. Devore It is certified that error appears in the above-identified patent and that said Letters Patent is hereby corrected as shown below:

In the Claims

In Claim 12, Column 10, Line 2; replace "impingement lets" with --impingement jets--

In Claim 13, Column 10, Line 11; replace "impingement lets" with --impingement jets--

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*